United States Patent
Nakamura et al.

(10) Patent No.: US 9,712,691 B2
(45) Date of Patent: Jul. 18, 2017

(54) IMAGE PROCESSING SYSTEM FOR COMBINING SCANNED DATA WITH PREVIOUSLY STORED DATA

(71) Applicant: BROTHER KOGYO KABUSHIKI KAISHA, Nagoya-shi, Aichi-ken (JP)

(72) Inventors: Tomoki Nakamura, Kasugai (JP); Nobuyuki Kamiya, Anjo (JP); Junjiro Yoshida, Nagoya (JP); Yongqi Sun, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/869,030

(22) Filed: Sep. 29, 2015

(65) Prior Publication Data
US 2016/0094730 A1      Mar. 31, 2016

(30) Foreign Application Priority Data
Sep. 30, 2014    (JP) ................................ 2014-201486

(51) Int. Cl.
*H04N 1/00*        (2006.01)
(52) U.S. Cl.
CPC ..... *H04N 1/00209* (2013.01); *H04N 1/00384* (2013.01); *H04N 1/00392* (2013.01); *H04N 2201/0094* (2013.01)
(58) Field of Classification Search
CPC .................................................. H04N 1/00209
USPC ............................................. 358/1.15, 1.16
See application file for complete search history.

(56) References Cited

U.S. PATENT DOCUMENTS

| | | | | |
|---|---|---|---|---|
| 8,515,930 | B2* | 8/2013 | Hong | H04N 1/00225 358/1.14 |
| 8,749,800 | B2* | 6/2014 | Rimai | G06F 17/214 358/1.11 |
| 2006/0074849 | A1* | 4/2006 | Lee | H04N 1/00236 |
| 2006/0268356 | A1* | 11/2006 | Shih | H04N 1/41 358/426.07 |
| 2010/0046023 | A1* | 2/2010 | Hong | H04N 1/00204 358/1.15 |

FOREIGN PATENT DOCUMENTS

JP       2005-191777 A       7/2005

* cited by examiner

*Primary Examiner* — Eric A Rust
(74) *Attorney, Agent, or Firm* — Merchant & Gould P.C.

(57) ABSTRACT

An information processing device may display a first image indicating a first image file stored in a memory. The information processing device may display a second image in response to receiving a first specific operation. The first specific operation may be performed on the first image. The information processing device may receive first path information in response to receiving a second specific operation. The first path information may indicate a location of the first image file. The information processing device may send an execution instruction to the image processing device in a case that the second specific operation is received. The information processing device may receive scan data from the image processing device. The information processing device may integrate the received scan data to the first image file designated by the first path information.

11 Claims, 8 Drawing Sheets

IMAGE PROCESSING SYSTEM FOR COMBINING SCANNED DATA WITH PREVIOUSLY STORED DATA

CROSS-REFERENCE TO RELATED APPLICATIONS

This application claims priority to Japanese Patent Application No. 2014-201486, filed on Sep. 30, 2014, the contents of which are hereby incorporated by reference into the present application.

TECHNICAL FIELD

The technique disclosed in the present specification relates to a program and the like for storing scan data.

DESCRIPTION OF RELATED ART

The following image data receipt method is known. A scanner generates a plurality of items of scan data by reading a plurality of documents. An information processing device receives the plurality of items of scan data from the scanner. Moreover, the information processing device generates and stores one image data file including the plurality of items of scan data.

SUMMARY

There is a case in which users want to add another scan data to the image data file that has already been stored in the information processing device. In this case, as a first example, it is necessary to add a document of which the scan data is to be added to a document used when generating the image data file that has already been stored in the information processing device and to scan all document again. Moreover, as a second example, it is necessary to combine and add scan data to be added to the stored image data file using various applications.

In one aspect of the teachings disclosed herein, a non-transitory computer-readable recording medium storing computer-readable instructions for an information processing device may be provided. The information processing device may comprise: a processor; a display; an input unit configured to receive various operation inputs; a memory configured to store various types of electronic files; and a communication interface configured to connect to a network. The information processing device may be configured to communicate via the communication interface with an image processing device. The image processing device may be configured to perform a scan process of scanning a document and generating scan data. The computer-readable instructions, when executed by the processor, may cause the information processing device to perform displaying a first image on the display, the first image indicating a first image file stored in the memory. The computer-readable instructions may cause the information processing device to perform displaying a second image on the display, in response to receiving a first specific operation in the input unit, the first specific operation being performed on the first image. The computer-readable instructions may cause the information processing device to perform receiving a second specific operation in the input unit, the second specific operation being for selecting the second image. The computer-readable instructions may cause the information processing device to perform receiving first path information in response to receiving the second specific operation, the first path information indicating a location of the first image file. The computer-readable instructions may cause the information processing device to perform sending an execution instruction of the scan process to the image processing device via the communication interface, in a case that the second specific operation is received in the input unit. The computer-readable instructions may cause the information processing device to perform receiving scan data generated by the scan process from the image processing device. The computer-readable instructions may cause the information processing device to perform integrating the received scan data to the first image file designated by the first path information.

EMBODIMENT

<Configuration of Communication System 1>

Figure 1:
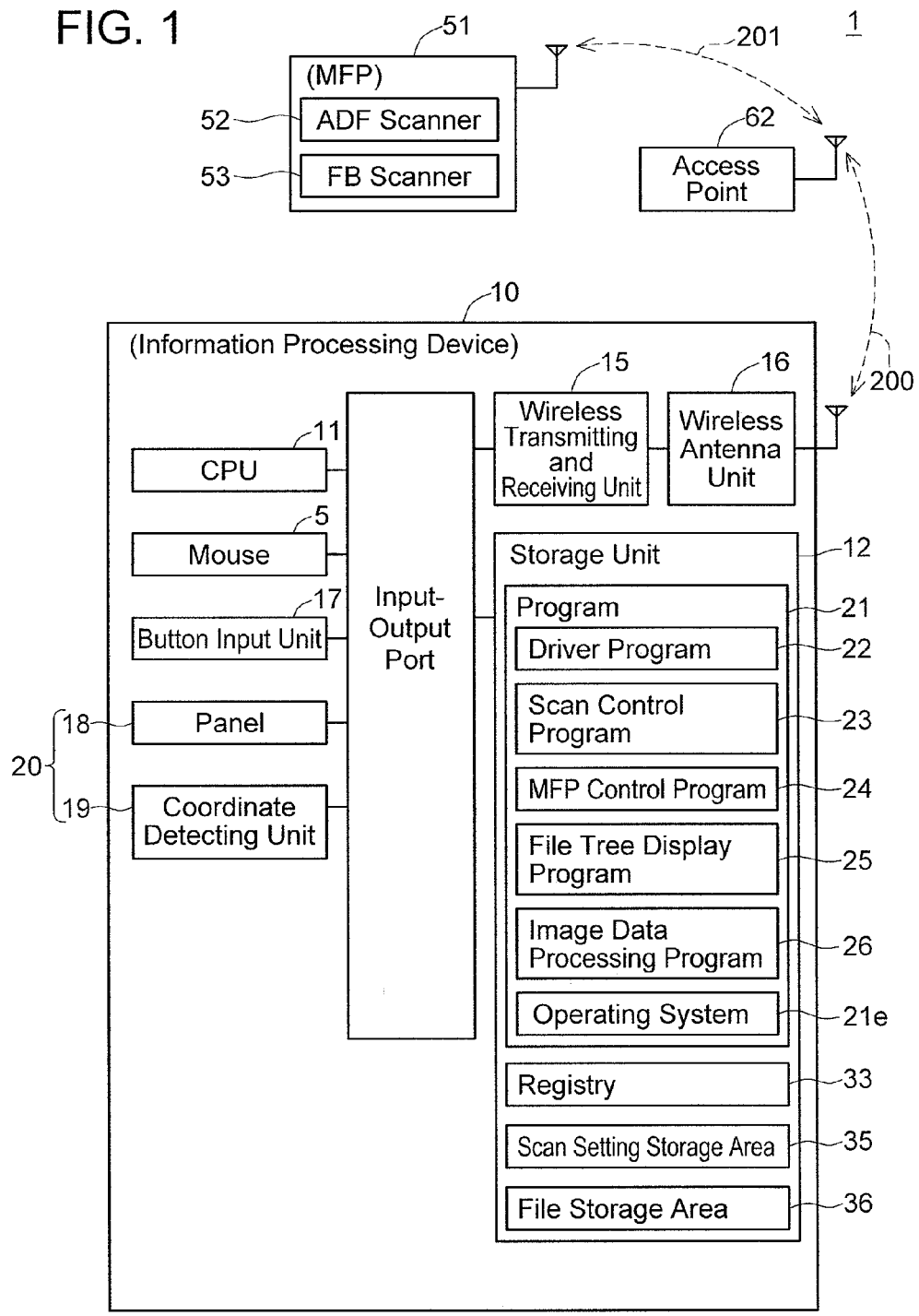
FIG. 1 is a block diagram of a communication system 1.

FIG. 1 illustrates a block diagram of a communication system 1 illustrated as an embodiment of the present application. The communication system 1 includes an information processing device 10, a multifunction peripheral (referred to as MFP) 51, and an access point 62. The information processing device 10 is a personal computer (referred to as PC) which uses a pointing device such as a mouse.

The MFP 51 is a multifunction peripheral having a printer function, a scanner function, a copier function, and other functions. The printer function is a function for executing a process of printing a printing image on a recording sheet. The scanner function is a function for executing a scan process of reading a document to generate scan data. The copier function is a function for executing a process of printing scan data on a recording sheet. The MFP 51 includes an ADF scanner 52 and an FB scanner 53. The auto document feeder (referred to as ADF) scanner 52 is a scanner having an automatic document feeder for feeding a plurality of pages of document automatically. The flatbed (referred to as FB) scanner 53 is such a type of scanner that one document is set on a glass bed and light is emitted from below to read an image while moving a reading device. The access point 62 is an existing relay device.

The information processing device 10 and the access point 62 can perform a wireless communication 200 according to an infrastructure-mode wireless LAN connection scheme. Moreover, the MFP 51 and the access point 62 can perform a wireless communication 201 according to an infrastructure-mode wireless LAN connection scheme. Examples of the scheme of the wireless communications 200 and 201 include a communication scheme defined by the IEEE 802.11a/b/g standards.

<Configuration of Information Processing Device 10>

The information processing device 10 chiefly comprises a mouse 5, a CPU (referred to as Central Processing Unit) 11, a storage unit 12, a wireless transmitting and receiving unit 15, a wireless antenna unit 16, a button input unit 17, a panel 18, and a coordinate detecting unit 19.

The wireless transmitting and receiving unit 15 performs wireless communication which conforms to an infrastructure mode of the wireless LAN, via the wireless antenna unit 16. The button input unit 17 receives an operation by a user of the information processing device 10. An example of the button input unit 17 is a keyboard.

The mouse 5 is a device for inputting pointer position information, selection instruction information, menu display information, and the like. The pointer position information is information indicating a moving direction or a moving amount of a pointer displayed on the panel 18. The pointer position information can be input by moving the mouse 5. The selection instruction information is information for giving an instruction to select an image corresponding to a display position of a pointer image. The selection instruction information can be input by a left-click operation of clicking a left-click button of the mouse 5. The menu display information is information for giving an instruction to display a menu image corresponding to a display position of a pointer image. The menu display information can be input by a right-click operation of clicking a right-click button of the mouse 5.

The panel 18 displays a variety of function information of the information processing device 10. The coordinate detecting unit 19 is a unit for detecting designated coordinates, these being coordinates indicating a position where an indicator (e.g., a fingertip of the user) is in contact with or in proximity to a display area of the panel 18. By being formed integrally with the panel 18, the coordinate detecting unit 19 functions as a touchscreen 20. The touchscreen 20 is a device for receiving the input such as selection instruction information or menu display information. The selection instruction information is information for giving an instruction to select an image corresponding to an instruction coordinate. The selection instruction information can be input by a tap operation of bringing a pointing tool into contact with the touchscreen 20 for a short period. The menu display information is information for giving an instruction to display a menu image corresponding to an instruction coordinate. The menu display information can be input by a long-press operation of bringing a pointing tool into contact with the touchscreen 20 for a long period.

That is, the information processing device 10 is a device capable of receiving an input operation utilizing the two input systems: the input system utilizing the mouse 5 and the input system utilizing the touchscreen 20.

The CPU 11 executes processing according to the program 21 stored in the storage unit 12. In the ensuing explanation, the CPU 11 to execute programs such as the document creation application 31 and the operating system 21e is sometimes simply referred to by the program name.

For example, the indication of "the operating system 21e" may mean "the CPU 11 that executes the operating system 21e".

The storage unit 12 is configured such that a RAM (referred to as Random Access Memory), a ROM (referred to as Read Only Memory), a flash memory, an HDD (referred to as hard disk drive), and a buffer provided in the CPU 11, etc. are combined. The storage unit 12 stores a program 21. The program 21 includes an operating system 21e, a driver program 22, a scan control program 23, a MFP control program 24, a file tree display program 25, and an image data processing program 26. The respective programs, the driver program 22 to the image data processing program 26, can be used by being installed in the information processing device 10 by a user. Moreover, the storage unit 12 stores a registry 33, an information processing table 34, a scan setting storage area 35, and a file storage area 36.

The operating system 21e (hereinafter sometimes referred to as an OS 21e) is a program that provides a function of displaying various images on the panel 18 and basic functions which are used in common to the respective programs, the driver program 22 to the image data processing program 26. Further, the operating system 21e is also a program that provides an API (referred to as Application Programming Interface) for the applications to provide instructions to various types of hardware. In the present specification, a case will be described in which Windows 8® (registered trademark of Microsoft Corporation) is utilized as the operating system 21e.

The driver program 22 is a program for controlling the MFP 51. The scan control program 23 is a program for controlling a scan process of the MFP 51. Due to the scan control program 23, it is possible to exchange various types of data (for example, scan data generated by the scan process) related to the scan process with the MFP 51. The scan control program 23 is a program that can be activated via a menu screen displayed by a right-click operation, which will be described later. The MFP control program 24 is a program for changing various settings of the MFP 51 and allowing the MFP 51 to execute various functions. The file tree display program 25 is a program for displaying various data files stored in the file storage area 36 in a tree structure. The image data processing program 26 is a program for performing various processing processes on image data. Examples of the processing process include a process of combining two image data files into one image data file.

The registry 33 is a database that stores setting data of various programs such as the operating system 21e or the driver program 22 to the image data processing program 26. When the scan control program 23 is installed in the information processing device 10, the registry key of the scan control program 23 is added to the registry 33. Specifically, the path of the scan control program 23 is added to the command data of the registry 33. In this way, an activation reception image N1 for receiving the input of an instruction to activate the scan control program 23 can be added to a right-click menu image (see FIG. 6) displayed in S225 (described later).

The file storage area 36 is an area in which various data files are stored. The file storage area 36 has a layered file structure which is a structure that stores data files using a plurality of folders. Each of the plurality of folders can store a sub-folder which is a lower-layer folder and various data files.

The image data files stored in the file storage area 36 may have a first image format or a second image format. The first image format is a multipage format capable of containing a plurality of pages of image data. Examples of the first image format include a tagged image file format (referred to as TIFF), a portable document format (referred to as PDF), and the like. The second image format is a non-multipage image format that can contain only one page of image data. Examples of the second image format include a joint photographic experts group (referred to as JPEG), bitmap, and the like.

The scan setting storage area 35 is an area in which a default scan setting value of the scan control program 23 and a default scan setting value of the MFP control program 24 are stored. The default scan setting value may be set in advance by a user. The default scan setting value may include resolution, the number of colors, an image format, an image size, and the like.

<Operation of OS 21e>

Figure 2:
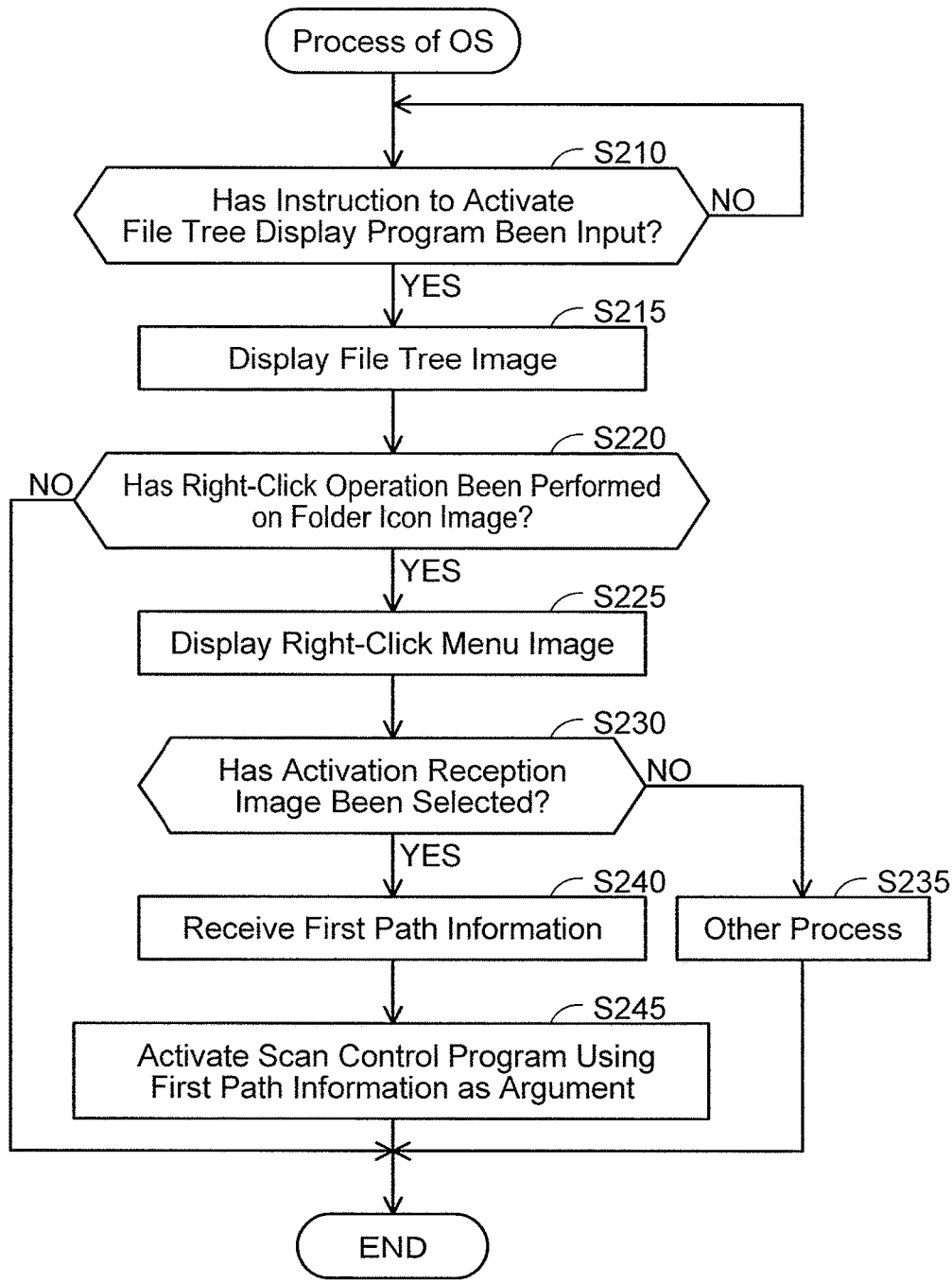
FIG. 2 is a diagram illustrating an operation flowchart of an OS.

The operation of the OS 21e according to the present embodiment will be described with reference to the flowchart of FIG. 2. When a user inputs an operation of activating the information processing device 10 via the button input unit 17, the CPU 11 reads the OS 21e to start controlling the entire information processing device 10. In this way, the flow of FIG. 2 starts.

In S210, the OS 21e determines whether an instruction to activate the file tree display program 25 has been input. This determination may be made, for example, by determining whether a double-click operation has been input for the icon image of the file tree display program 25. The flow returns to S210 when a negative determination result is obtained (S210: NO), and proceeds to S215 when a positive determination result is obtained (S210: YES).

Figure 5:
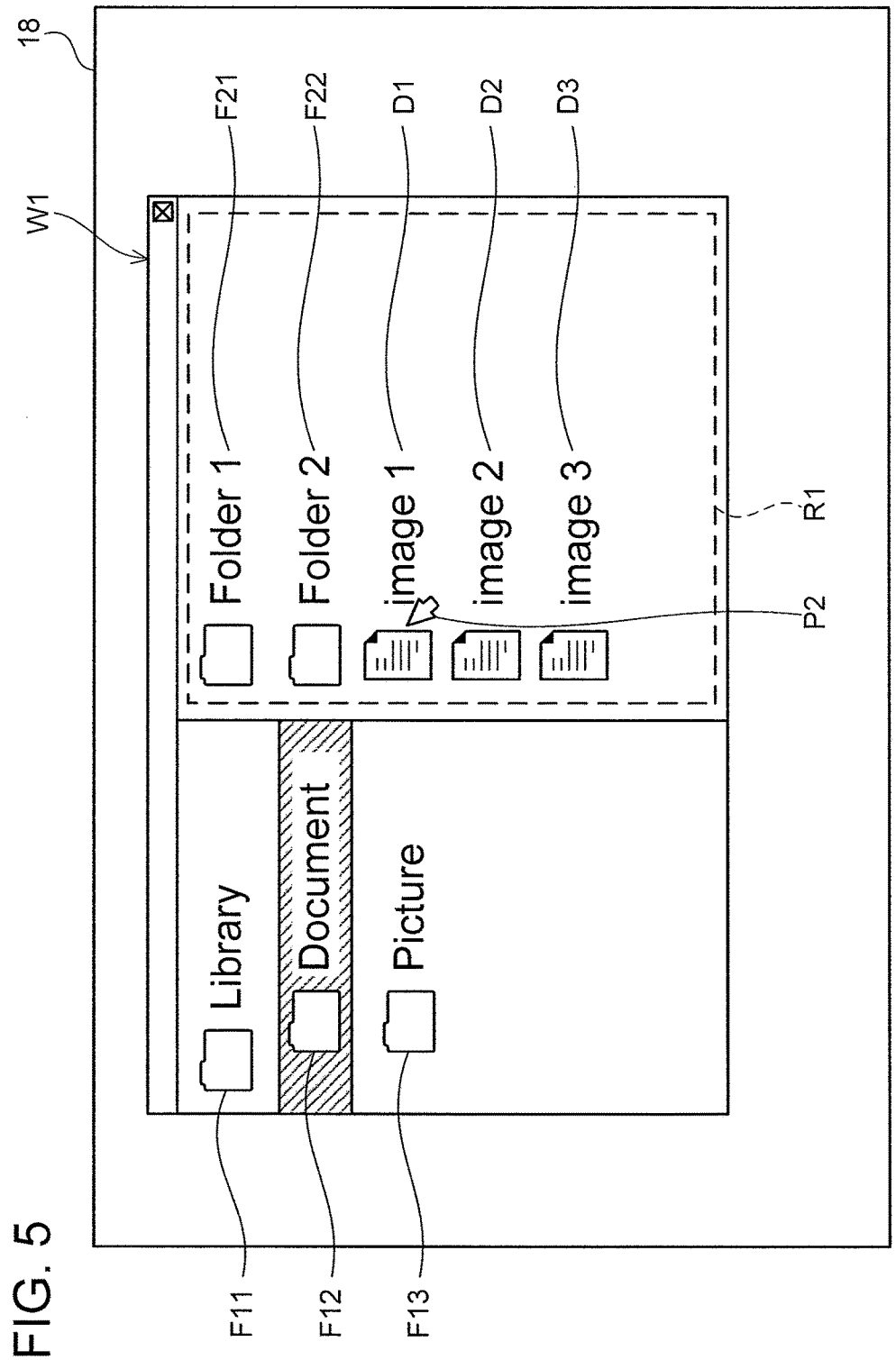
FIG. 5 is a diagram illustrating an example of a display screen.

In S215, the OS 21e activates the file tree display program 25. Moreover, the OS 21e displays a file tree image on the panel 18. FIG. 5 illustrates a file tree image W1 which is an example of the file tree image. The file tree image W1 includes folder icon images F11 to F13, F21, and F22 and data file icon images D1 to D3. As illustrated in the file tree image W1, the file storage area 36 stores various data files in a layered file structure using a plurality of folders. Specifically, folders indicated by the folder icon images F12 and F13 are stored in the folder indicated by the folder icon image F11. The folder indicated by the folder icon image F11 is a highest-layer folder of the layered file structure. In FIG. 5, a case in which the folder icon image F12 is selected is described. In this case, the content stored in the folder indicated by the folder icon image F12 is displayed in a display area R1. The display area R1 includes the folder icon images F21 and F22, the data file icon images D1 to D3, and a blank area image R2. The blank area image R2 is an area in which any one of the folder icon image and the data file icon image is not displayed. As described above, in the layered file structure of the file storage area 36, folders and data files may be stored together in a certain folder. In the description example of the present embodiment, the operation when the display screen illustrated in FIG. 5 is displayed will be described.

In S220, the OS 21e determines whether a right-click operation has been performed on at least one of the data file icon images. For example, as illustrated in FIG. 5, in a state in which a pointer image P2 is present in the display area of the data file icon image D1, when the right-click button of the mouse 5 is clicked and the menu display information is input, the OS 21e determines that a right-click operation has been performed on the data file icon image D1. In S220, the right-click operation on a plurality of data file icon images may be received. In S220, the flow ends when a negative determination result is obtained (S220: NO), and proceeds to S225 when a positive determination result is obtained (S220: YES).

Figure 6:
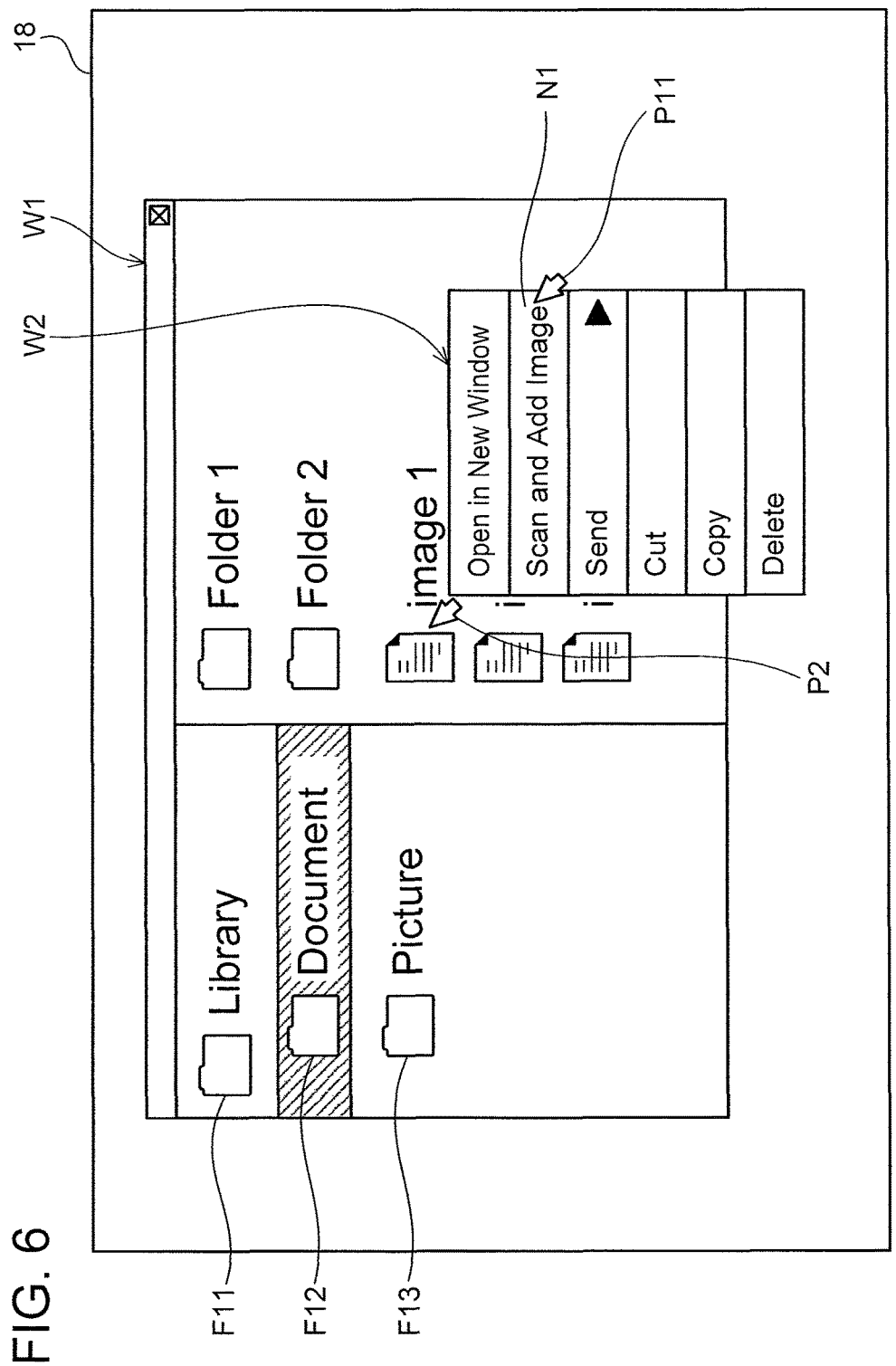
FIG. 6 is a diagram illustrating an example of a display screen.

In S225, the OS 21e displays the right-click menu image on the panel 18 in a pull-down manner. The right-click menu image includes an activation reception image for receiving the input of an instruction to activate the scan control program 23. FIG. 6 illustrates a right-click menu image W2 which is an example of the right-click menu image. The right-click menu image W2 is an image displayed when the right-click button of the mouse 5 is clicked in the state of the pointer image P2 of FIG. 5. The right-click menu image W2 includes reception images for receiving the input of various instructions. The activation reception image N1 is one of the reception images. The activation reception image N1 includes a character string (for example, "scan and add image") that gives an instruction to activate the scan control program 23.

In S230, the OS 21e determines whether the activation reception image has been selected. For example, as illustrated in FIG. 6, in a state in which the pointer image P11 is present in the display area of the activation reception image N1, when a left-click button of the mouse 5 is single-clicked and the selection instruction information is input, the OS 21e determines that the activation reception image N1 is selected. When a negative determination result is obtained in S230 (S230: NO), the flow proceeds to S235 and the other processes are executed. After that, the flow ends. On the other hand, when a positive determination result is obtained (S230: YES), the flow proceeds to S240.

In S240, the OS 21e receives first path information for accessing a data file indicated by the data file icon image on which the right-click operation has been input. The first path information may be an absolute path. For example, as illustrated in FIG. 5, in a state in which the pointer image P2 is present in the display area of the data file icon image D1, when the right-click operation is input, first path information for accessing a "image 1" data file indicated by the data file icon image D1 is received. Moreover, when the right-click operation on a plurality of data file icon images is received in S220, the OS 21e receives a plurality of items of first path information for accessing the plurality of data files in S240.

In S245, the OS 21e activates the scan control program 23 using the first path information received in S240 as an argument. After that, the flow ends.

<Operation of Scan Control Program 23>

Figure 3:
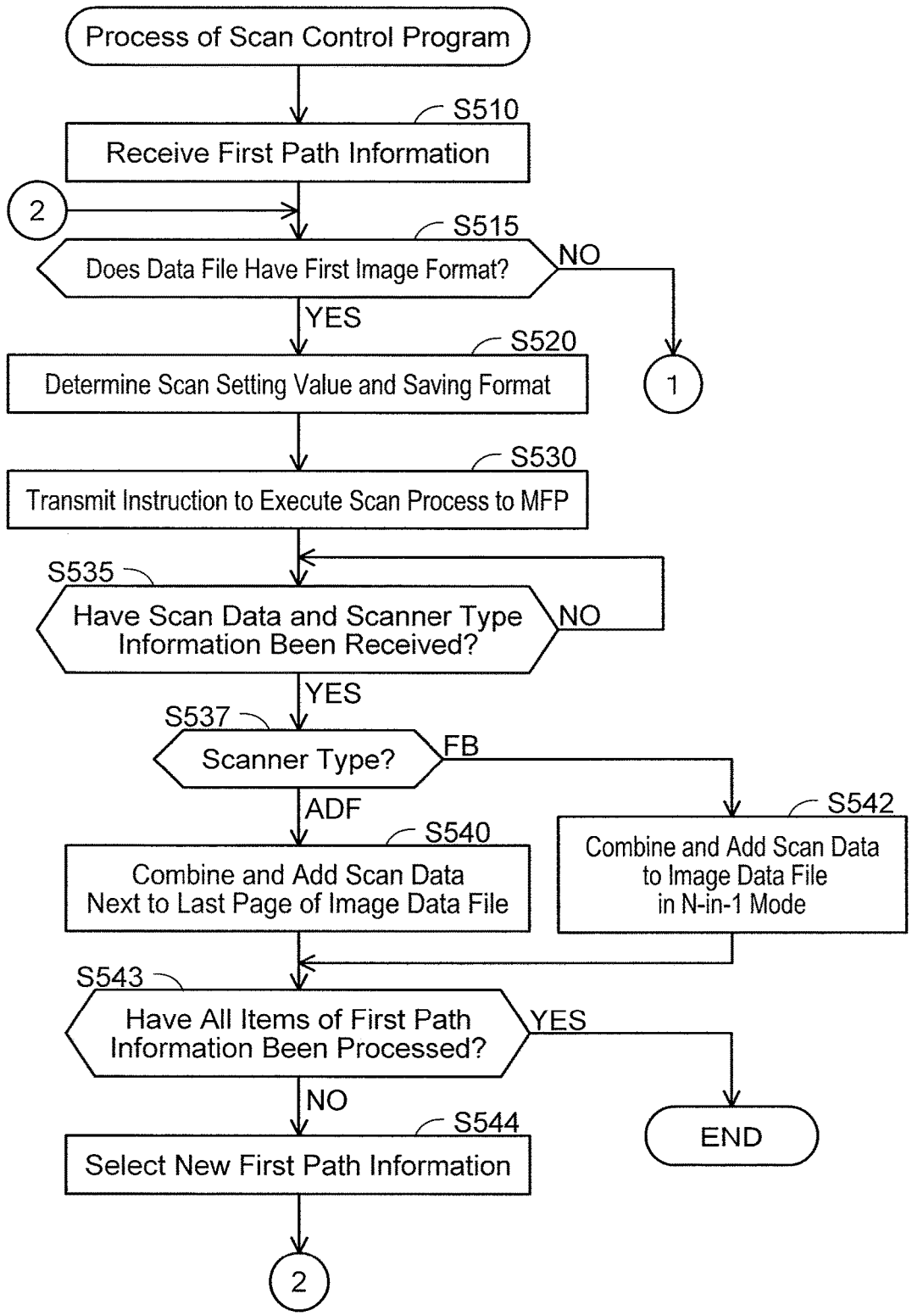
FIG. 3 is a diagram illustrating an operation flowchart of a scan control program.
Figure 4:
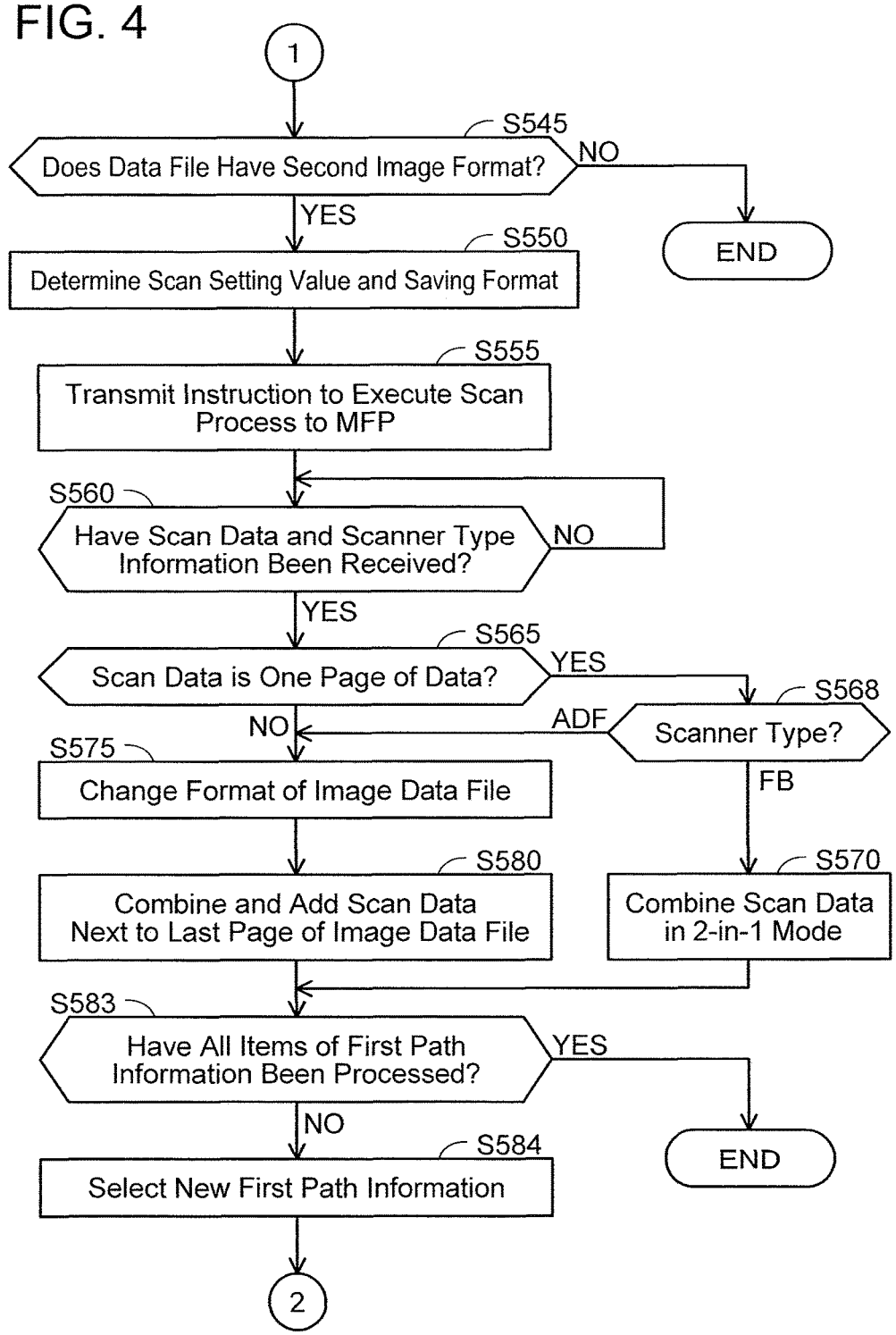
FIG. 4 is a diagram illustrating an operation flowchart of a scan control program.

The operation of the scan control program 23 according to the present embodiment will be described with reference to the flowcharts of FIGS. 3 and 4. In S245, the flow of FIG. 3 starts in response to activation of the scan control program 23. In S510, the scan control program 23 receives the first path information based on the argument generated in S240.

In S515, the scan control program 23 determines whether the format of the data file indicated by the first path information is a first image format (that is, a multipage image format). When a positive determination result is obtained in S515 (S515: YES), the flow proceeds to S520.

In S520, the scan control program 23 determines the scan setting value and the saving format based on the attribute of the image data file indicated by the first path information. The attribute of the image data file may include resolution, the number of colors, an image size, an image format, and the like. The scan setting value is a value indicating the attribute to be provided in the scan data generated by the MFP 51. Examples of the scan setting value includes resolution (for example, 300 dpi), the number of colors (for example, color), an image size (for example, A4-size), and the like. The saving format is an image format used when adding (S540) the scan data received from the MFP 51 to the image data file indicated by the first path information. After that, the flow proceeds to S530.

In S530, the scan control program 23 transmits an instruction to execute the scan process to the MFP 51 via the wireless transmitting and receiving unit 15 and the wireless antenna unit 16. The instruction to execute the scan process is information for instructing the MFP 51 to generate the scan data corresponding to the scan setting value determined in S520. After that, the flow proceeds to S535.

When receiving the instruction to execute the scan process, the MFP 51 reads a document to generate scan data. When a document is set on an automatic document feeder, the MFP 51 generates the scan data using the ADF scanner 52. Moreover, when a document is set on a glass bed, the MFP 51 generates the scan data using the FB scanner 53. Moreover, the MFP 51 generates scanner type information. The scanner type information is information indicating whether the scan data was generated using the ADF scanner 52 or the FB scanner 53.

In the description example of the present embodiment, the operation when J pages (J is a natural number of 1 or more) of document are set on the automatic document feeder will be described. In this case, the MFP 51 transmits the J pages of scan data and the scanner type information indicating the use of the ADF scanner 52 to the information processing device 10.

In S535, the scan control program 23 determines whether the scan data and the scanner type information have been received from the MFP 51. The flow returns to S535 when a negative determination result is obtained (S535: NO) and proceeds to S537 when a positive determination result is obtained (S535: YES).

In S537, the scan control program 23 determines which scanner is indicated by the received scanner type information as a scanner used for generating the scan data. When the scanner type information indicates the ADF scanner (S537: ADF), the flow proceeds to S540.

In S540, the scan control program 23 combines and adds the J pages of scan data received in S535 to a position next to the last page of the image data file designated by the first path information. Specifically, when the image data file designated by the first path information includes K pages (K is a natural number of 1 or more) of image data, the received J pages of scan data are combined so as to be added to a position next to the (K+1) page. After that, the flow proceeds to S543.

Moreover, in S537, when the scanner type information indicates a FB scanner (S537: FB), the flow proceeds to S542. In S542, the scan control program 23 combines and adds the J pages of scan data received in S535 to the image data file designated by the first path information in an N-in-1 mode (N is a natural number of 2 or more). Specifically, one page of image area indicated by the image data file is divided into N divided areas. Moreover, the image that is indicated by the image data file designated by the first path information is allocated to the first divided area. Further, the image indicated by the received scan data is allocated to the second divided area. After that, the flow proceeds to S543.

Figure 10:
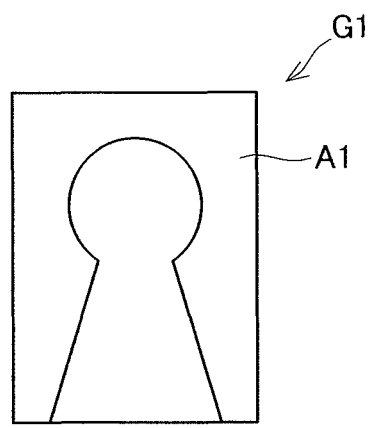
FIG. 10 is a diagram illustrating an example of an image that is combined in a 4-in-1 mode.
Figure 11:
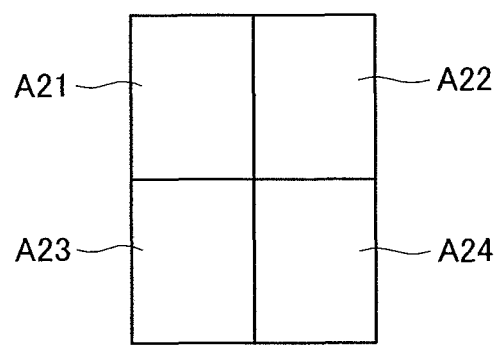
FIG. 11 is a diagram illustrating an example of an image that is combined in a 4-in-1 mode.
Figure 12:
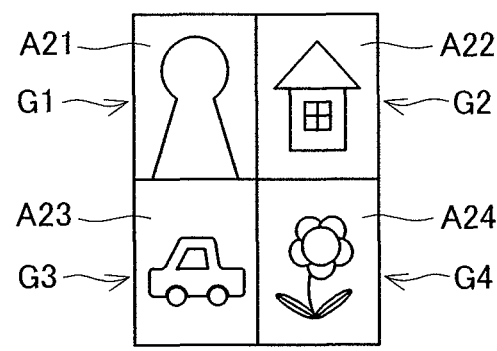
FIG. 12 is a diagram illustrating an example of an image that is combined in a 4-in-1 mode.

As an example, a method of combining scan data in a 4-in-1 mode when N is "4" will be described with reference to FIGS. 10 to 12. Moreover, the case in which three pages of scan data are received will be described. FIG. 10 illustrates one page of image G1 that is indicated by the image data file designated by the first path information. As illustrated in FIG. 11, an area A1 in which the image G1 is displayed is divided into four divided areas A21 to A24. The orientation of divided areas is determined automatically by the number of divisions. When four divided areas are generated, the orientation of the divided area before division is the same as the orientation of the divided area after division. Moreover, the size of divided areas is determined automatically by the number of divisions. When four divided areas are generated, the size of the divided area after division is reduced approximately by 25% in area ratio from the size of the divided area before division. As illustrated in FIG. 12, the image G1 is allocated to the divided area A21. Moreover, the images G2 to G4 indicated by the received three pages of scan data are allocated to the divided areas A22 to A24, respectively. In this way, a process of combining scan data in a 4-in-1 mode is completed.

In S543, the scan control program 23 determines whether the process of combining scan data has been executed on all items of first path information. When a positive determination result is obtained (S543: YES), the flow ends. On the other hand, when a negative determination result is obtained (S543: NO), it is determined that a plurality of items of first path information have been received in S240, and the first path information which has not been subjected to the scan data combining process is present. Thus, the flow proceeds to S544. In S544, the scan control program 23 selects one new item of first path information which has not been subjected to the scan data combining process. After that, the flow returns to S515 and the scan data combining process is executed on the new first path information.

On the other hand, when a negative determination result is obtained in S515 (S515: NO), the flow proceeds to S545. In S545, the scan control program 23 determines whether the format of the data file indicated by the first path information is a second image format (that is, a non-multipage image format). When a negative determination result is obtained (S545: NO), the flow ends. An example of the case in which a negative determination result is obtained is the case in which the data file indicated by the first path information is different from the image data file (for example, a data file of word processor software). On the other hand, when a positive determination result is obtained (S545: YES), the flow proceeds to S550.

In S550, the scan control program 23 determines the scan setting value and the saving format based on the attribute of the image data file indicated by the first path information. The specific content of the process of S550 is the same as the content of the process of S520, and redundant description thereof will not be provided. After that, the flow proceeds to S555.

In S555, the scan control program 23 transmits an instruction to execute the scan process to the MFP 51 via the wireless transmitting and receiving unit 15 and the wireless antenna unit 16. The instruction to execute the scan process is information for instructing the MFP 51 to generate the scan data corresponding to the scan setting value determined in S550. The specific content of the process of S555 is the same as the content of the process of S530, and redundant description thereof will not be provided. After that, the flow proceeds to S560.

In S560, the scan control program 23 determines whether the scan data and the scanner type information have been received from the MFP 51. The flow returns to S560 when a negative determination result is obtained (S560: NO) and proceeds to S565 when a positive determination result is obtained (S560: YES).

In S565, the scan control program 23 determines whether the received scan data is one page of data. When a positive determination result is obtained (S565: YES), the flow proceeds to S568. In S568, the scan control program 23 determines which scanner is indicated by the received scanner type information as a scanner used for generating the scan data. The flow proceeds to S575 when the scanner type information indicates the ADF scanner (S568: ADF) and proceeds to S570 when the scanner type information indicates the FB scanner (S568: FB).

In S570, the scan control program 23 combines and adds the received one page of scan data to the image data file designated by the first path information in a 2-in-1 mode. After that, the flow proceeds to S583.

Figure 7:
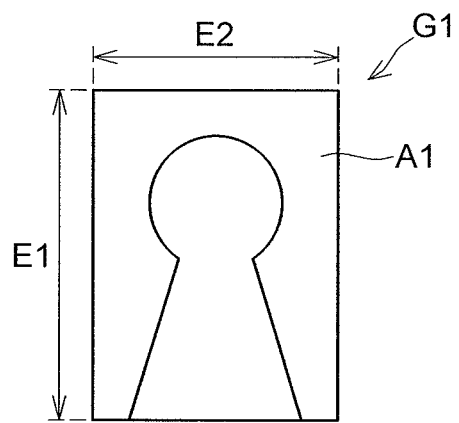
FIG. 7 is a diagram illustrating an example of an image that is combined in a 2-in-1 mode.

A method of combining scan data in a 2-in-1 mode will be described in detail with reference to FIGS. 7 to 9. FIG. 7 illustrates one page of image G1 that is indicated by the image data file designated by the first path information.

Figure 8:
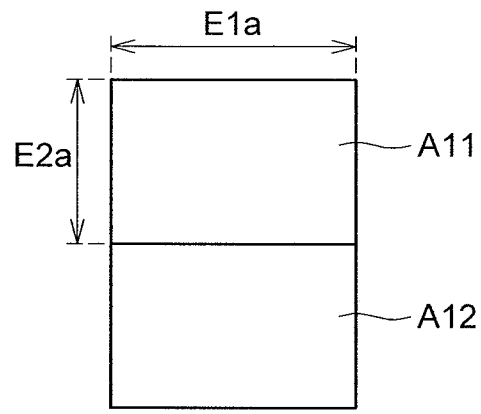
FIG. 8 is a diagram illustrating an example of an image that is combined in a 2-in-1 mode.

As illustrated in FIG. 8, an area A1 in which the image G1 is displayed is divided into two divided areas A11 and A12. The area is divided so that the ratio of the long side E1$a$ to the short side E2$a$ after division is the same as the ratio of the long side E1 to the short side E2 before division. The orientation of divided areas is determined automatically by the number of divisions. When two divided areas are generated, the orientation of divided areas after division is rotated by 90 degrees in relation to the orientation of divided areas before division. Moreover, the size of divided areas is determined automatically by the number of divisions. When two divided areas are generated, the size of the divided area after division is reduced approximately by 50% in area ratio from the size of the divided area before division.

Figure 9:
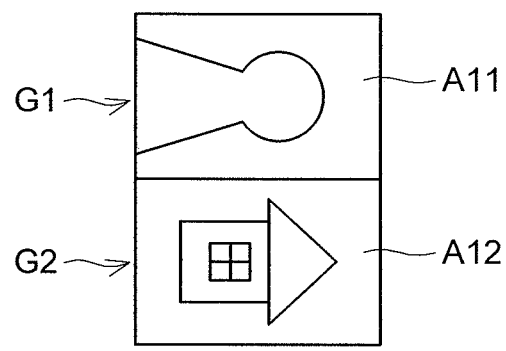
FIG. 9 is a diagram illustrating an example of an image that is combined in a 2-in-1 mode.

As illustrated in FIG. 9, the image G1 is allocated to the divided area A11. Moreover, the image G2 indicated by the received one page of scan data is allocated to the divided area A12. In this way, the process of combining scan data in a 2-in-1 mode is completed.

On the other hand, when a negative determination result is obtained in S565 (S565: NO), the flow proceeds to S575. In S575, the scan control program 23 changes the format of the image data file designated by the first path information from the second image format (that is, the non-multipage image format) to the first image format (that is, the multipage image format). For example, the format of the image data file may be changed from bitmap to TIFF. After that, the flow proceeds to S580.

In S580, the scan control program 23 combines and adds a plurality of pages of scan data received in S560 to the image data file designated by the first path information. The specific content of the process of S580 is the same as the content of the process of S540, and redundant description thereof will not be provided. After that, the flow proceeds to S583.

The contents of the processes of S583 and S584 are the same as the contents of the processes of S543 and S544. Thus, detailed description thereof will not be provided.

<Advantages>

According to the scan control program 23 and the like disclosed in the present specification, by inputting a right-click operation on the selected data file icon image (S220), it is possible to transmit an instruction to execute the scan process to the MFP 51 (S530, S555). Moreover, it is possible to combine and add the scan data received from the MFP 51 to the image data file indicated by the selected data file icon image (S540, S580). In this way, by executing a simple operation of inputting a right-click operation on the data file icon image, it is possible to add scan data to the image data file on which the right-click operation has been input. That is, it is possible to save the labor and time required for adding a document of which the scan data is to be added to a document used when generating the image data file and scanning all document again. Moreover, it is possible to save the labor and time required for combining and adding scan data to be added to the stored image data file using the image data processing program 26. Thus, it is possible to improve operability.

According to the scan control program 23 and the like disclosed in the present specification, it is possible to determine the scan setting value and the saving format automatically based on the attribute of the image data file corresponding to the data file icon image on which the right-click operation has been input (S520, S550). Since it is not necessary to perform an operation of inputting the scan setting value and the saving format, it is possible to improve the user's convenience.

According to the scan control program 23 and the like disclosed in the present specification, when the format of the image data file indicated by the first path information is the first image format (that is, the multipage image format) (S515: YES) and the image data file includes K pages of image data, it is possible to add the received scan data to the position next to the (K+1) page (S540). In this way, it is possible to combine and add the scan data received from the MFP 51 to the image data file appropriately.

According to the scan control program 23 and the like disclosed in the present specification, when the format of the image data file indicated by the first path information is the second image format (that is, the non-multipage image format) (S515: NO), it is possible to combine and add the received one page of scan data to the image data file designated by the first path information in a 2-in-1 mode (S570). In this way, it is possible to add an image indicated by the scan data while maintaining the number of pages of the image data that is included in the image data file indicated by the first path information to one page. Thus, even when the image data file has a non-multipage image format, it is possible to combine and add scan data to the image data file appropriately.

When two pages or more of scan data are combined and added to the image data file having the second image format (that is, the non-multipage image format), the one page of image area indicated by the image data file is divided into four or more divided areas. In this case, since the respective images allocated to the divided areas are reduced by 25% in area ratio, the readability may deteriorate. According to the scan control program 23 disclosed in the present specification, when a plurality of pages of scan data are received from the MFP 51 (S565: NO), the format of the image data file designated by the first path information can be changed from the second image format to the first image format (that is, the multipage image format) (S575). In this way, the plurality of pages of scan data can be combined and added to the position next to the last page of the image data file designated by the first path information (S580). Thus, it is not necessary to reduce the image indicated by each of the plurality of pages of scan data. Therefore, it is possible to prevent a decrease in the readability of the images indicated by the plurality of pages of scan data.

A card-shaped certificate such as a license and a booklet-shaped certificate such as a passport needs to be scanned using the FB scanner 53. When a certificate is scanned using the FB scanner 53, it is often desirable to display the images on one sheet in an N-in-1 mode. According to the scan control program 23 disclosed in the present specification, when the received scanner type information indicates that the scan data has been generated using the FB scanner (S537: FB), the scan data can be added automatically in an N-in-1 mode (S542). Thus, it is possible to improve the user's convenience.

When a document is scanned using the ADF scanner 52, in many case, the document is originally divided into a plurality of pages. In this case, it is often desirable to use a mode in which a plurality of pages of images are included in the image data file. According to the scan control program 23 disclosed in the present specification, when the received scanner type information indicates that "the scan data has been generated using the ADF scanner" (S568: ADF), even if the scan data is one page of data (S565: YES), the scan data can be added in a multipage mode automatically (S575, S580). Thus, it is possible to improve the user's convenience.

In S220, when a right-click operation on a plurality of data file icon images is received, a plurality of items of first path information are present. According to the scan control program 23 disclosed in the present specification, the steps S515 to S543 and S545 to S583 can be executed repeatedly until the process of combining and adding scan data for all items of first path information is executed. In this way, it is possible to combine and add common scan data to the plurality of data files indicated by the plurality of data file icon images.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

In the present embodiment, although a case in which the menu display information is input by the right-click operation has been described, the present invention is not limited to this embodiment. Even when the menu display information is input by a long-press operation on the touchscreen 20, the technique described in the present specification can be realized.

The information processing device 10 is not limited to a PC. The information processing device 10 may be a tablet terminal or a smartphone that receives the input of an operation on a touchscreen.

The communication between the information processing device 10 and the MFP 51 is not limited to the wireless communications 200 and 201. For example, the communication may be realized by a USB connection. In this case, the information processing device 10 may include a USB interface. Moreover, the information processing device 10 may be connected to the MFP 51 by a USB interface and a USB cable.

In S520, when the data file indicated by the first path information includes a plurality of pages of image data, the scan setting value may be determined for each page based on the attribute of the page. In S530, an execution instruction for generating scan data may be transmitted based on the scan setting value of each page. For example, when the first page of the data file indicated by the first path information is color and the second and subsequent pages are monochrome, an execution instruction may be transmitted so that the first page of scan data is color and the second and subsequent pages are monochrome.

The process of determining the scan setting value and the saving format in S520 or S550 may be omitted. In this case, the scan setting value and the saving format may be determined using the default scan setting value of the scan control program 23 and the default scan setting value of the MFP control program 24, stored in the scan setting storage area 35.

In S245, the OS 21e may activate the MFP control program 24.

The manner of display of the display screens shown FIGS. 5 and 6 are examples, and other display modes may also be utilized.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

Each program may be constituted by a single program module or by a plurality of program modules. Each example may adopt another replaceable configuration which is within the context of the present invention. Adoptable configurations include a hardware configuration (the panel 18 or the like) which operates according to an instruction by a computer, and a configuration in which a computer and a hardware configuration work in conjunction with each other. Obviously, adoptable configurations also include a computer which executes processing by coupling processing based on a plurality of programs, and a hardware configuration which operates according to an instruction by a computer which executes processing by coupling processing based on a plurality of programs.

The invention claimed is:

1. A non-transitory computer-readable recording medium storing computer-readable instructions for an information processing device, the information processing device comprising:
a processor;
a display;
an input unit that receives various operation inputs;
a memory that stores various types of electronic files; and
a communication interface that connects to a network,
the information processing device communicating via the communication interface with an image processing device, the image processing device performing a scan process of scanning a document and generating scan data, wherein the computer-readable instructions, when executed by the processor, cause the information processing device to perform:

displaying a first image on the display, the first image indicating a first image file stored in the memory;

displaying a second image on the display, in response to receiving a first specific operation in the input unit, the first specific operation being performed on the first image;

receiving a second specific operation in the input unit, the second specific operation being for selecting the second image;

receiving first path information in response to receiving the second specific operation, the first path information indicating a location of the first image file;

sending an execution instruction of the scan process to the image processing device via the communication interface, in a case that the second specific operation is received in the input unit;

receiving scan data generated by the scan process from the image processing device; and determining whether the first image file is in a first format, the first format being that the first image file can include only one page of image data, wherein in a case that the first image file is in the first format, the computer-readable instructions cause the information processing device to further perform:

dividing an image region corresponding to the one page into N pieces of divided regions, wherein N is a natural number of 2 or more;

allocating an image of the one page of image data included in the first image file designated by the first path information to a first divided region; and allocating an image of first page of the received scan data to a second divided region.

2. The non-transitory computer-readable recording medium according to claim 1, wherein the computer-readable instructions cause the information processing device to further perform retrieving a first setting value of an attribute of a particular image file stored in the memory, the execution instruction includes an instruction to generate the scan data according to the first setting value, and the received scan data is generated based on the first setting value.

3. The non-transitory computer-readable recording medium according to claim 1, wherein the computer-readable instructions cause the information processing device to further perform:

determining whether the first image file is in a second format, the second format being that the first image file can include plural pages of image data; and determining whether the first image file includes K pages of image data, wherein K is a natural number of 1 or more, and in a case that the first image file is in the second format and includes K pages of image data, the received scan data is integrated as a (K+1)-th or subsequent page in the first image file.

4. The non-transitory computer-readable recording medium according to claim 1, wherein in a case that the first image file is in the first format, the computer-readable instructions cause the information processing device to further perform:

determining whether the received scan data includes plural pages of image data; and in a case that the received scan data includes plural pages of image data, changing the format of the first image file to the second format, wherein a first page of image data of the received scan data is integrated as a second page in the first image file.

5. The non-transitory computer-readable recording medium according to claim 1, wherein the computer-readable instructions cause the information processing device to further perform:

receiving first information through the communication interface, the first information indicating a type of a scanner that had generated the scan data;

determining whether the received first information indicates that the received scan data had been generated by a flat-bed scanner;

in a case that the received first information indicates that the received scan data had been generated by a flat-bed scanner, dividing an image region corresponding to one page into N pieces of divided regions, wherein N is a natural number of 2 or more;

allocating an image of image data included in the first image file to a first divided region; and allocating an image of the received scan data to a second divided region.

6. The non-transitory computer-readable recording medium according to claim 1, wherein the computer-readable instructions cause the information processing device to further perform:

receiving first information through the communication interface, the first information indicating a type of a scanner that had generated the scan data;

determining whether the received first information indicates that the received scan data had been generated by scanner with an automatic document feeder; and determining whether the first image file includes K pages of image data, wherein K is a natural number of 1 or more, and in a case that the received first information indicates that the received scan data had been generated by a scanner with an automatic document feeder and the first image file includes K pages of image data, the received scan data is integrated as a (K+1)-th or subsequent page in the first image file.

7. The non-transitory computer-readable recording medium according to claim 1, wherein a second image file different from the first image file is stored in the memory, the computer-readable instructions cause the information processing device to further perform receiving a second path information indicating a location of the second image file, and the received scan data is integrated to the second image file designated by the second path information.

8. The non-transitory computer-readable recording medium according to claim 1, wherein the information processing device further includes a mouse, and the first specific operation is a right-click on the mouse where a pointer image is located on the first image.

9. The non-transitory computer-readable recording medium according to claim 1, wherein the information processing device further includes a touchscreen configured to detect a instruction coordinate indicating a position of a pointer's contact or approach in a display region of the display, and the first specific operation is that the pointer contacts with or approaches the display where the first image is displayed over a particular time or larger.

10. The non-transitory computer-readable recording medium according to claim 1, wherein the memory further stores a first program for overall control of the information processing device, and a second program for controlling the scan process to be performed in the image processing device, when executed by the processor of the information processing device, the first program causes the information processing device to perform the displaying of the first image and the displaying of the second image, the second program is activated in response to receiving the second specific operation, and when executed by the processor of the information processing device, the second program causes the information processing device to perform the receiving of the first path information, the sending of the execution instruction, the receiving of the scan data, and the integrating of the received scan data.

11. An information processing device comprising:
a display;
an input unit that receives various operation inputs;
one or more processors;
a memory that stores various types of electronic files; and
a communication interface that connects to a network,
wherein the information processing device communicates via the communication interface with an image processing device, the image processing device performs a scan process of scanning a document and generating scan data,
the memory further stores computer-readable instructions that, when executed by the one or more processors, cause the information processing device to perform:
displaying a first image on the display, the first image indicating a first image file stored in the memory;
displaying a second image on the display, in response to receiving a first specific operation in the input unit, the first specific operation being performed on the first image;
receiving a second specific operation in the input unit, the second specific operation being for selecting the second image;
receiving first path information in response to receiving the second specific operation, the first path information indicating a location of the first image file;
sending an execution instruction of the scan process to the image processing device via the communication interface, in a case that the second specific operation is received in the input unit;
receiving scan data generated by the scan process from the image processing device; and
determining whether the first image file is in a first format, the first format being that the first image file can include only one page of image data,
wherein in a case that the first image file is in the first format, the computer-readable instructions cause the information processing device to further perform:
dividing an image region corresponding to the one page into N pieces of divided regions, wherein N is a natural number of 2 or more;
allocating an image of the one page of image data included in the first image file designated by the first path information to a first divided region; and
allocating an image of first page of the received scan data to a second divided region.

* * * * *